United States Patent
Shichino

(10) Patent No.: US 11,063,477 B2
(45) Date of Patent: Jul. 13, 2021

(54) POWER TRANSMISSION APPARATUS, POWER RECEIVING APPARATUS, CONTROL METHOD, AND COMPUTER-READABLE STORAGE MEDIUM

(71) Applicant: CANON KABUSHIKI KAISHA, Tokyo (JP)

(72) Inventor: Takahiro Shichino, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 226 days.

(21) Appl. No.: 16/130,200

(22) Filed: Sep. 13, 2018

(65) Prior Publication Data
US 2019/0013703 A1  Jan. 10, 2019

Related U.S. Application Data

(63) Continuation of application No. PCT/JP2017/007503, filed on Feb. 27, 2017.

(30) Foreign Application Priority Data

Mar. 29, 2016 (JP) .............................. JP2016-066317
Mar. 29, 2016 (JP) .............................. JP2016-066319

(51) Int. Cl.
*H02J 50/80* (2016.01)
*H02J 50/60* (2016.01)
(Continued)

(52) U.S. Cl.
CPC .............. *H02J 50/80* (2016.02); *H02J 7/025* (2013.01); *H02J 50/10* (2016.02); *H02J 50/12* (2016.02);
(Continued)

(58) Field of Classification Search
CPC .. H02J 50/80; H02J 50/90; H02J 50/10; H02J 50/12; H02J 50/60; H02J 7/025;
(Continued)

(56) References Cited

U.S. PATENT DOCUMENTS

2010/0151808 A1* 6/2010 Toncich ............... H04B 5/0037
455/226.3
2010/0311317 A1  12/2010 McReynolds et al.
2015/0372531 A1  12/2015 Tanabe

FOREIGN PATENT DOCUMENTS

JP  2007-325339 A  12/2007
JP  2009-253649 A  10/2009
(Continued)

OTHER PUBLICATIONS

International Search Report and Written Opinion issued in International Patent Application No. PCT/JP2017/007503 (dated Apr. 4, 2017).

(Continued)

*Primary Examiner* — Carlos Amaya
(74) *Attorney, Agent, or Firm* — Venable LLP

(57) ABSTRACT

A power transmission apparatus has a power transmission function of sending power to a power receiving apparatus in wireless power transmission, and a communication function of performing communication using a frequency different from a frequency of an electromagnetic wave used in the wireless power transmission. The power transmission function limits the power to be sent to the power reception function in a case where the communication function is performing the communication.

12 Claims, 11 Drawing Sheets

(51) Int. Cl.
*H04B 1/40* (2015.01)
*H02J 50/10* (2016.01)
*H04B 5/00* (2006.01)
*H02J 7/02* (2016.01)
*H02J 50/90* (2016.01)
*H02J 50/12* (2016.01)
*H04B 1/16* (2006.01)
*H01M 10/42* (2006.01)
*H02J 7/00* (2006.01)
*H04B 1/04* (2006.01)

(52) U.S. Cl.
CPC .............. *H02J 50/60* (2016.02); *H02J 50/90* (2016.02); *H04B 1/16* (2013.01); *H04B 1/40* (2013.01); *H04B 5/0037* (2013.01); *H01M 10/4257* (2013.01); *H02J 7/00034* (2020.01); *H04B 1/04* (2013.01)

(58) Field of Classification Search
CPC ......... H02J 7/00034; H04B 1/16; H04B 1/40; H04B 5/0037; H04B 1/04; H01M 10/4257
See application file for complete search history.

(56) References Cited

FOREIGN PATENT DOCUMENTS

| | | |
|---|---|---|
| JP | 2011-152008 A | 8/2011 |
| JP | 2014-075857 A | 4/2014 |
| JP | 2014-093818 A | 5/2014 |
| JP | 2014-155376 A | 8/2014 |
| JP | 2014-225980 A | 12/2014 |

OTHER PUBLICATIONS

Office Action in Japanese Patent Application No. 2016-066319, dated Jul. 10, 2020 (with English translation).

\* cited by examiner

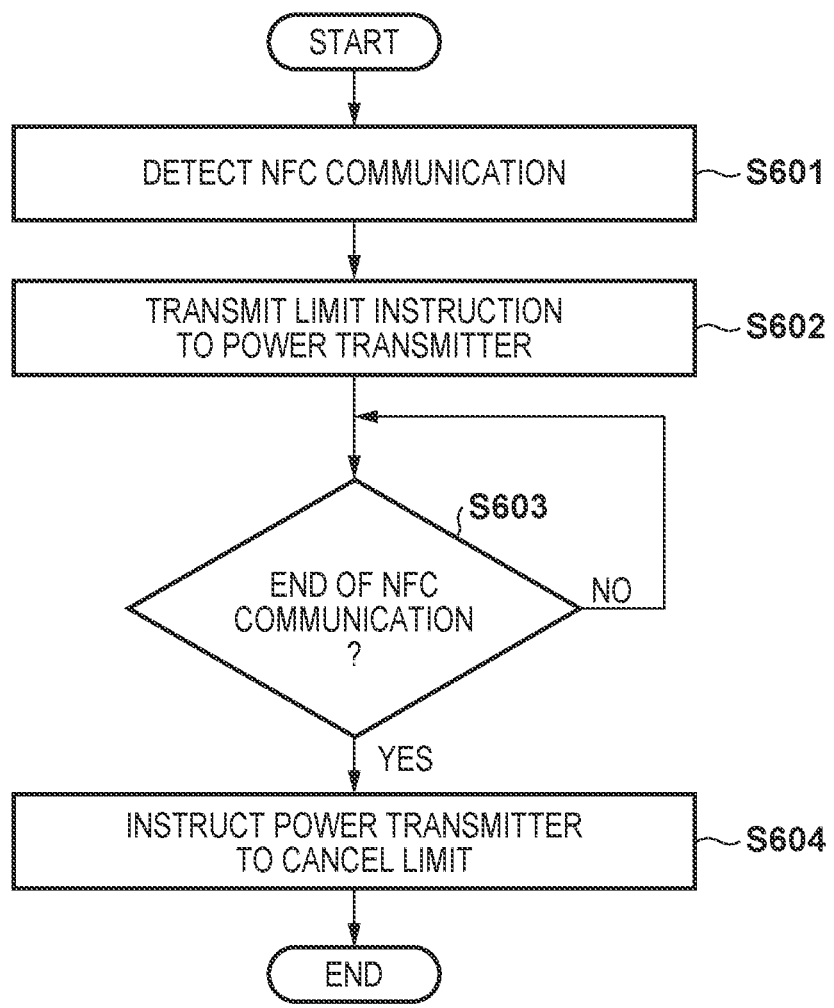

POWER TRANSMISSION APPARATUS, POWER RECEIVING APPARATUS, CONTROL METHOD, AND COMPUTER-READABLE STORAGE MEDIUM

CROSS-REFERENCE TO RELATED APPLICATIONS

This application is a continuation of International Patent Application No. PCT/JP2017/007503 filed on Feb. 27, 2017, and claims priority to Japanese Patent Application Nos. 2016-066317 filed on Mar. 29, 2016, and 2016-066319 filed on Mar. 29, 2016, the entire contents of which are incorporated herein by reference.

BACKGROUND OF THE INVENTION

Field of the Invention

The present invention relates to a wireless power transmission technology.

Background Art

In recent years, a device having a wireless communication function and a wireless power transmission function has been examined. PTL 1 discloses a device having an NFC (Near Field communication) communication function and a wireless power transmission function.

CITATION LIST

Patent Literature

PTL 1: Japanese Patent Laid-Open No. 2014-075857

There is a problem that an electromagnetic wave (or a harmonic thereof) of a frequency used in wireless power transmission exerts an influence on another wireless communication (such as, for example, NFC) and, therefore, the wireless communication cannot normally be performed.

The present invention has been made in consideration of the above-described problem, and reduces interference of an electromagnetic wave of wireless power transmission with another wireless communication.

SUMMARY OF THE INVENTION

According to an aspect of the present invention, there is provided a power transmission apparatus comprising a power transmission unit configured to send power to a power receiving apparatus in wireless power transmission, and a communication unit configured to perform communication using a frequency different from a frequency of an electromagnetic wave used in the wireless power transmission, wherein the power transmission unit limits the power to be sent to the power receiving apparatus in a case where the communication unit is performing the communication.

According to another aspect of the present invention, there is provided a power receiving apparatus comprising a power reception unit configured to receive power from a power transmission apparatus in wireless power transmission, and a communication unit configured to communicate with the power transmission apparatus, wherein the communication unit is controlled not to request the power transmission apparatus to increase the power to be sent from the power transmission apparatus in a case where the communication unit receives a notification representing that the power to be sent from the power transmission apparatus to the power receiving apparatus is limited.

According to still another aspect of the present invention, there is provided a power receiving apparatus comprising a power reception unit configured to receive power by an electromagnetic wave sent using a first frequency from a power transmission apparatus in wireless power transmission, a first communication unit configured to perform control communication associated with the wireless power transmission with the power transmission apparatus, and a second communication unit configured to perform communication using a second frequency different from the first frequency, wherein the first communication unit transmits, to the power transmission apparatus, a notification representing that the power to be sent by the wireless power transmission should be limited when the communication by the second communication unit is performed.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 6 is a flowchart showing an example of the procedure of processing executed by the control unit of the power transmission apparatus;

DESCRIPTION OF THE EMBODIMENTS

Embodiments of the present invention will now be described with reference to the accompanying drawings. Note that each of the following embodiments will be explained assuming a wireless power transmission system that transmits power from a power transmission apparatus 100 to a power receiving apparatus 200 by wireless power transmission.

First Embodiment

If power transmission by wireless power transmission is performed during wireless communication such as NFC performed by at least one of the power transmission apparatus 100 and the power receiving apparatus 200 or a device on the periphery, the wireless power transmission may interfere with the wireless communication. This can occur in a case in which while the wireless power transmission system transmits power as high as several ten watt, a signal is received by a receiver at power as low as several milliwatt in wireless communication (such as, for example, NFC). For example, switching noise generated when a switching circuit in the power transmission apparatus 100 converts a DC voltage into an AC voltage can be superimposed on the power transmitted by the wireless power transmission. In this case, the switching noise may interfere with a low power signal in wireless communication, and the signal may be distorted, resulting in degradation of communication quality.

For this reason, upon detecting that wireless communication such as NFC is performed, the power transmission apparatus 100 according to this embodiment limits power transmission by wireless power transmission apparatus configurations used to perform such processing and the procedures of processing will be described below.

Apparatus Configuration

Figure 1:
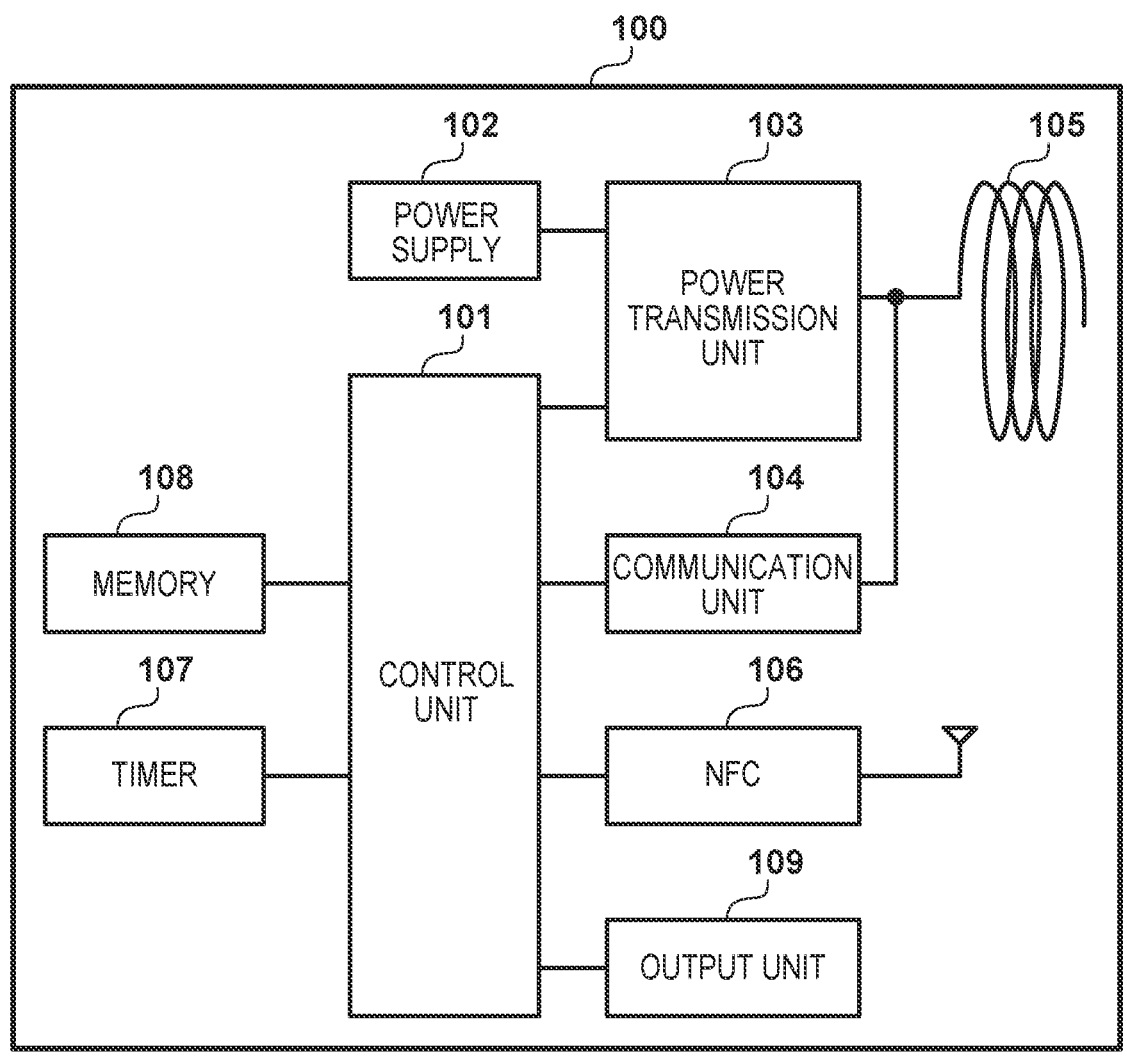
FIG. 1 is a block diagram showing an example of the configuration of a power transmission apparatus.

FIG. 1 is a block diagram showing an example of the configuration of the power transmission apparatus 100 according to this embodiment. The power transmission apparatus 100 includes, for example, a control unit 101, a power supply 102, a power transmission unit 103, a communication unit 104, a power transmission antenna 105, an NFC unit 106, a timer 107, a memory 108, and an output unit 109.

The control unit 101 controls the entire apparatus by executing a control program stored in, for example, the memory 108. In an example, the control unit 101 is a CPU (Central Processing Unit). The control unit 101 can use the memory 108 even when storing the value of a variable acquired during execution of the control program. In addition, the control unit 101 can measure time using the timer 107. The power supply 102 supplies power to the power transmission unit 103 when the power transmission apparatus 100 transmits the power to the power receiving apparatus 200 by wireless power transmission. The power supply 102 is, for example, a commercial power supply or a battery.

The power transmission unit 103 converts DC power or AC power input from the power supply 102 into AC power of a frequency band used in wireless power transmission and generates an electromagnetic wave to be sent to the power receiving apparatus 200 via the power transmission antenna 105. In this embodiment, the frequency of AC power is different from the operating frequency of NFC to be described later. For example, a frequency of several hundred kHz is used in wireless power transmission, and the operating frequency of NFC is 13.56 MHz. The power transmission unit 103 outputs the electromagnetic wave used to send power from the power transmission antenna 105 to the power receiving apparatus 200 based on an instruction of the control unit 101. In addition, the power transmission unit 103 can control the intensity of the electromagnetic wave to be output by adjusting the voltage (transmission voltage) or a current (transmission current) to be input to the power transmission antenna 105. When the transmission voltage or transmission current becomes high, the intensity of the electromagnetic wave increases accordingly. In addition, the power transmission unit 103 can perform control to stop power transmission from the power transmission antenna 105 based on an instruction of the control unit 101.

The communication unit 104 performs control communication concerning wireless power transmission with a communication unit 204 of the power receiving apparatus 200. Note that the communication unit 104 performs communication for control by a method of superimposing on the power transmitted from the power transmission antenna 105 (for example, by modulating the power sent from the power transmission antenna 105).

The NFC unit 106 is a reader/writer complying with the NFC (Near Field Communication) standard and performs communication complying with the NFC standard with an NFC unit 202 of the power receiving apparatus 200. Note that the communication of the NFC unit 106 is performed via an NFC antenna different from the power transmission antenna 105. In addition, the communication performed by the NFC unit 106 is, for example, communication performed to execute an application that is not associated with the control communication of wireless power transmission.

The output unit 109 performs various kinds of outputs to the user. Here, the output by the output unit 109 includes at least one of a color change, blinking, and lighting of an LED (Light Emitting Diode), display on a screen, sound output by a speaker, a vibration output, and the like.

Note that the power transmission apparatus 100 need not always be an apparatus that exclusively performs power transmission and may be an apparatus such as a printer or a PC, which has other functions and can also perform power transmission.

Figure 2:
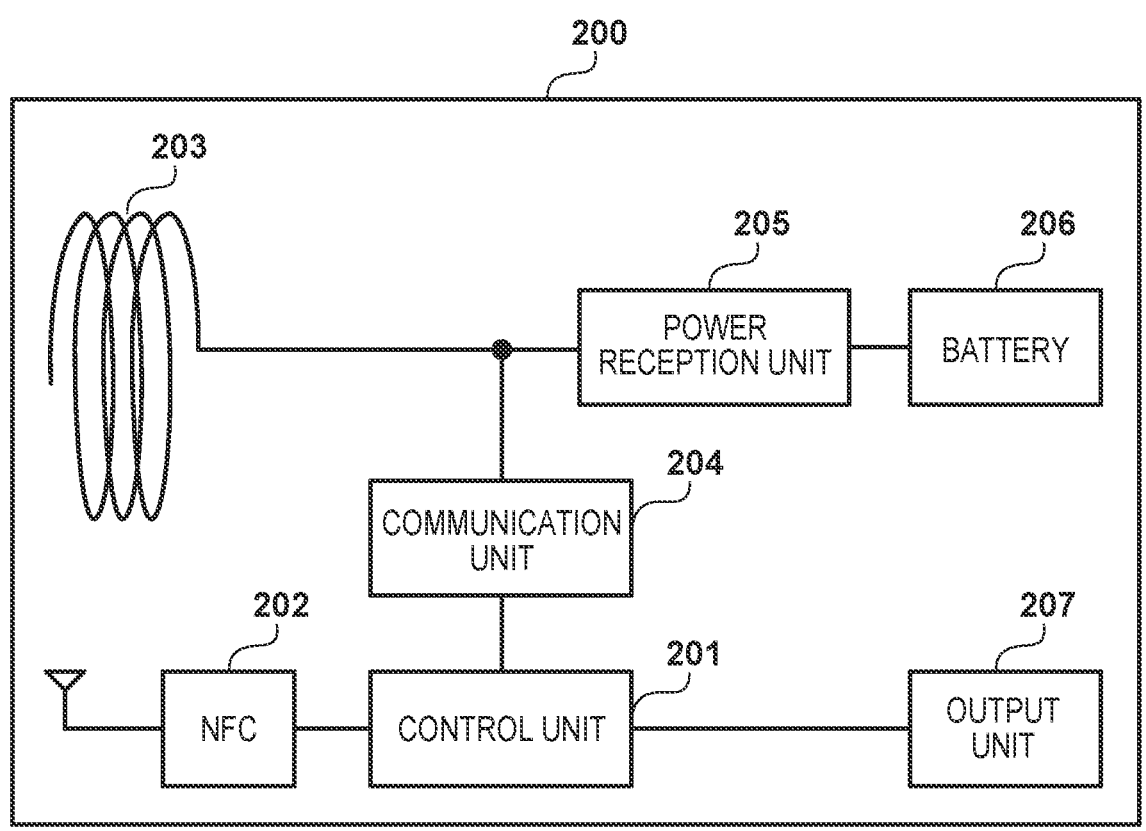
FIG. 2 is a block diagram showing an example of the configuration of a power receiving apparatus.

FIG. 2 is a block diagram showing an example of the configuration of the power receiving apparatus 200 according to this embodiment. The power receiving apparatus 200 includes, for example, a control unit 201, the NFC unit 202, a power reception antenna 203, the communication unit 204, a power reception unit 205, a battery 206, and an output unit 207. The control unit 201 is a control unit that controls the power receiving apparatus 200. The control unit 201 can be a CPU that controls the entire apparatus by executing a control program stored in, for example, a memory (not shown). The NFC unit 202 is an NFC tag complying with the NFC standard and performs communication complying with the NFC standard with the NFC unit 106 of the power transmission apparatus 100. The communication of the NFC unit 202 is performed via an NFC antenna different from the power reception antenna 203.

The power reception antenna 203 is an antenna used to receive the electromagnetic wave sent from the power transmission apparatus 100. The power reception unit 205 performs power reception by generating power from the electromagnetic wave received by the power reception antenna 203. The power reception unit 205 obtains AC power by resonance that is caused in a circuit in the power reception unit 205 by the electromagnetic wave received by the power reception antenna 203. The power reception unit 205 then converts the AC power into DC power to AC power of a desired frequency and supplies the power after conversion to the battery 206 or a charge circuit in a battery (not shown). The battery 206 stores the power received by the power reception unit 205.

Here, if the voltage detected by the power reception unit 205 exceeds a predetermined value, for example, if power capable of receiving sufficient power to activate the control unit 201 and the communication unit 204 of the power receiving apparatus 200 is received, control communication of wireless power transmission is performed via the communication unit 204. Note that the communication unit 204 performs control communication via the power reception antenna 203. The output unit 207 performs various kinds of outputs to the user. Here, the output by the output unit 207 includes at least one of a color change, blinking, and lighting of an LED, display on a screen, sound output by a speaker, a vibration output, and the like.

Figure 3:
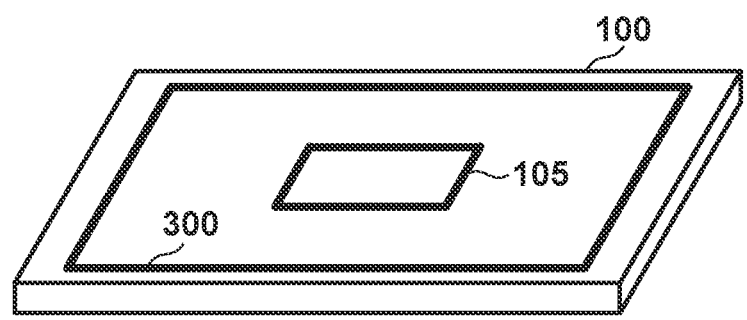
FIG. 3 is a view showing an example of the arrangement of an NFC antenna and a power transmission antenna.

FIG. 3 is a view showing an example of the arrangement of the power transmission antenna 105 and an antenna 300 of the NFC unit 106 in the power transmission apparatus 100. As shown in FIG. 3, for example, the power transmission antenna 105 is arranged so as to be surrounded by the antenna 300 of the NFC unit 106. Note that the power reception antenna 203 and the NFC antenna of the NFC unit 202 in the power receiving apparatus 200 also hold such a relationship that the power reception antenna 203 is arranged so as to be surrounded by the NFC antenna, as in FIG. 3. With this configuration, when the power receiving apparatus 200 is placed on the power transmission apparatus 100, control communication in wireless power transmission and transmission/reception of power can be performed together with the communication complying with the NFC standard. Note that antenna arrangement shown in FIG. 3 is merely an example, and the antenna for wireless power transmission and the other antenna for wireless communication using a frequency different from that of the wireless power transmission may be arranged at arbitrary positions. For example, the power transmission antenna (or power reception antenna) for wireless power transmission may be arranged side by side in the closest proximity of the antenna for NFC.

Figure 4:
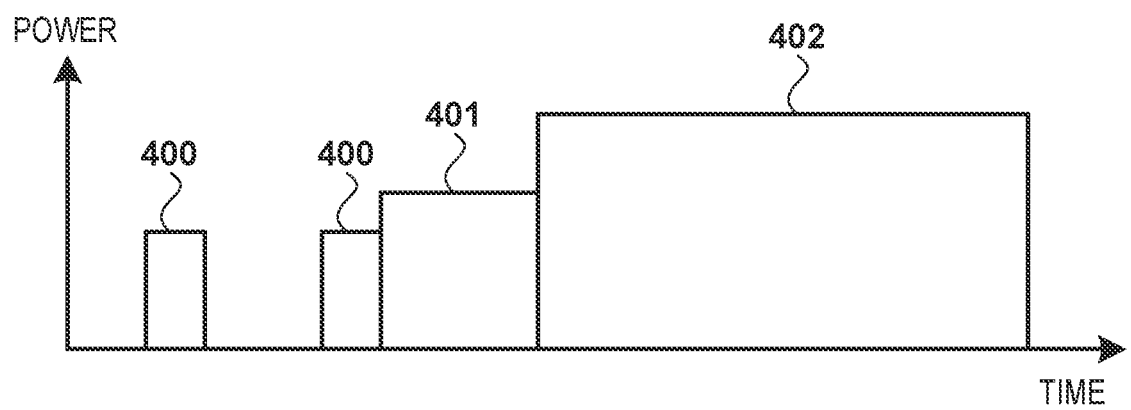
FIG. 4 is a view showing an example of power sent from a power transmission unit.

FIG. 4 shows power sent from the power transmission unit 103 of the power transmission apparatus 100 via the power transmission antenna 105. Referring to FIG. 4, the abscissa represents time, and the ordinate represents the magnitude of power. The power transmission apparatus 100 periodically sends low power 400 for object detection to detect existence of an object within a power-transmittable range. During sending of the low power 400, the power transmission apparatus 100 causes a detection unit (not shown) to operate. The detection unit detects a voltage value or a current value on the periphery of the power transmission unit 103 or calculates an impedance obtained by dividing the detected voltage value by the detected current value, and detecting whether an object exists within the power-transmittable range. If an object exists within the power-transmittable range, an eddy current flows to the object, and the voltage value, current value, or impedance detected or calculated by the detection unit exhibits a value different that in a case in which no object exists within the power-transmittable range. That is, the power transmission apparatus 100 can detect an object by detecting a change in the voltage value, current value, and impedance on the periphery of the power transmission unit 103.

When the power transmission apparatus 100 detects a change in the voltage value, current value, or impedance, the power transmission unit 103 sends medium power 401 higher than the low power. The medium power 401 is power having a sufficient magnitude to activate the control unit 201 and the communication unit 204 of the power receiving apparatus 200, but may be power whose magnitude is not sufficient to charge the battery. During transmission of the medium power 401, the power transmission apparatus 100 and the power receiving apparatus 200 perform control communication such as authentication processing in the wireless power transmission system and a negotiation for transmission power. When the negotiation for transmission power is established between the power transmission apparatus 100 and the power receiving apparatus 200, the power transmission unit 103 sends charge power 402 higher than the medium power as the result of the negotiation. Note that in this embodiment, the charge power 402 can influence the quality of NFC communication between the NFC unit 106 and the NFC unit 202. However, the medium power 401 and the low power 400 do not influence the quality of the NFC communication.

Procedure of Processing

Figure 5A:
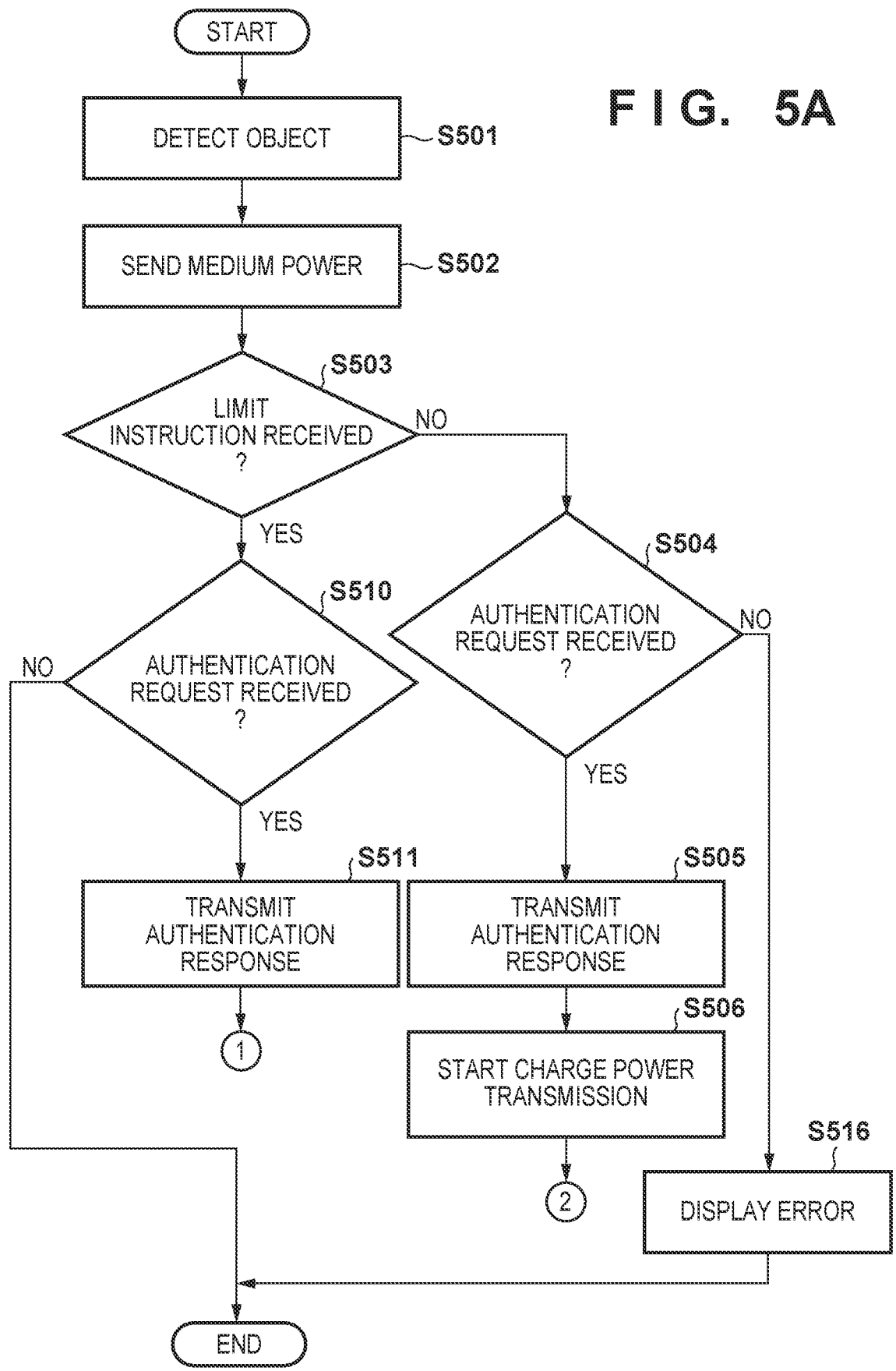
FIG. 5A is a flowchart showing an example of the procedure of processing executed by the power transmitter of the power transmission apparatus.
Figure 5B:
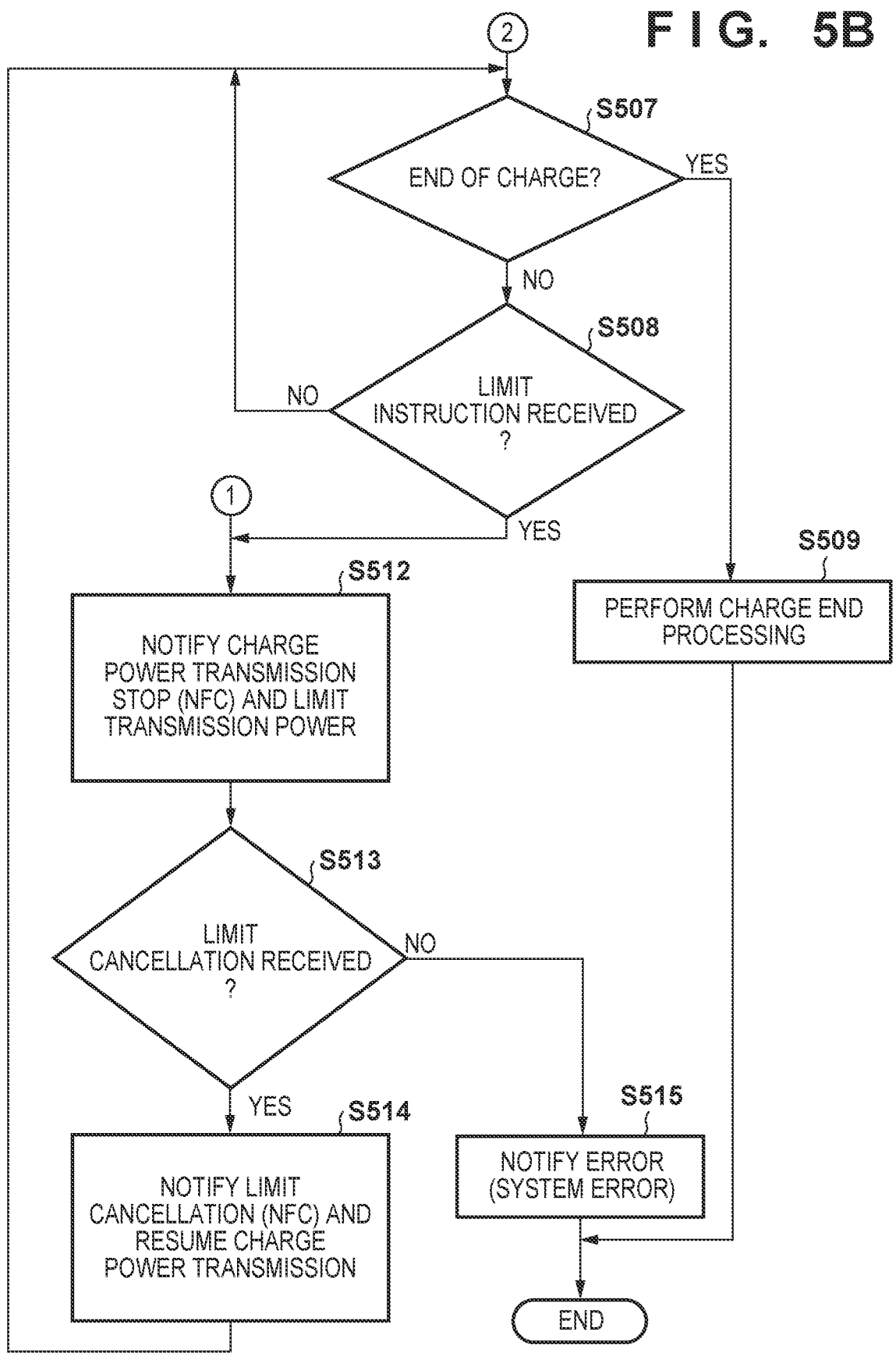
FIG. 5B is a flowchart showing an example of the procedure of processing executed by the power transmitter of the power transmission apparatus.
Figure 7:
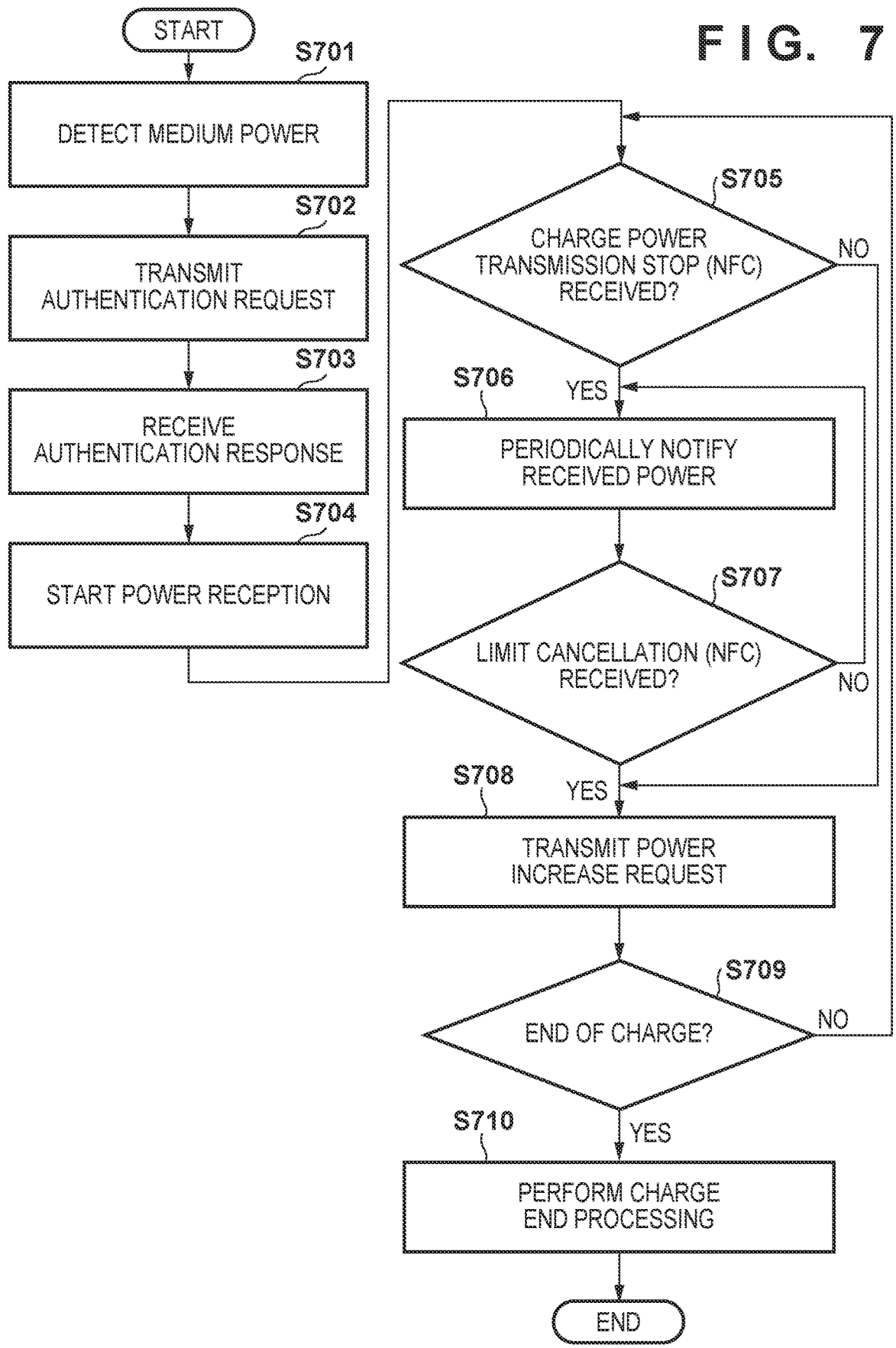
FIG. 7 is a flowchart showing an example of the procedure of processing executed by the power receiver of the power receiving apparatus.
Figure 8:
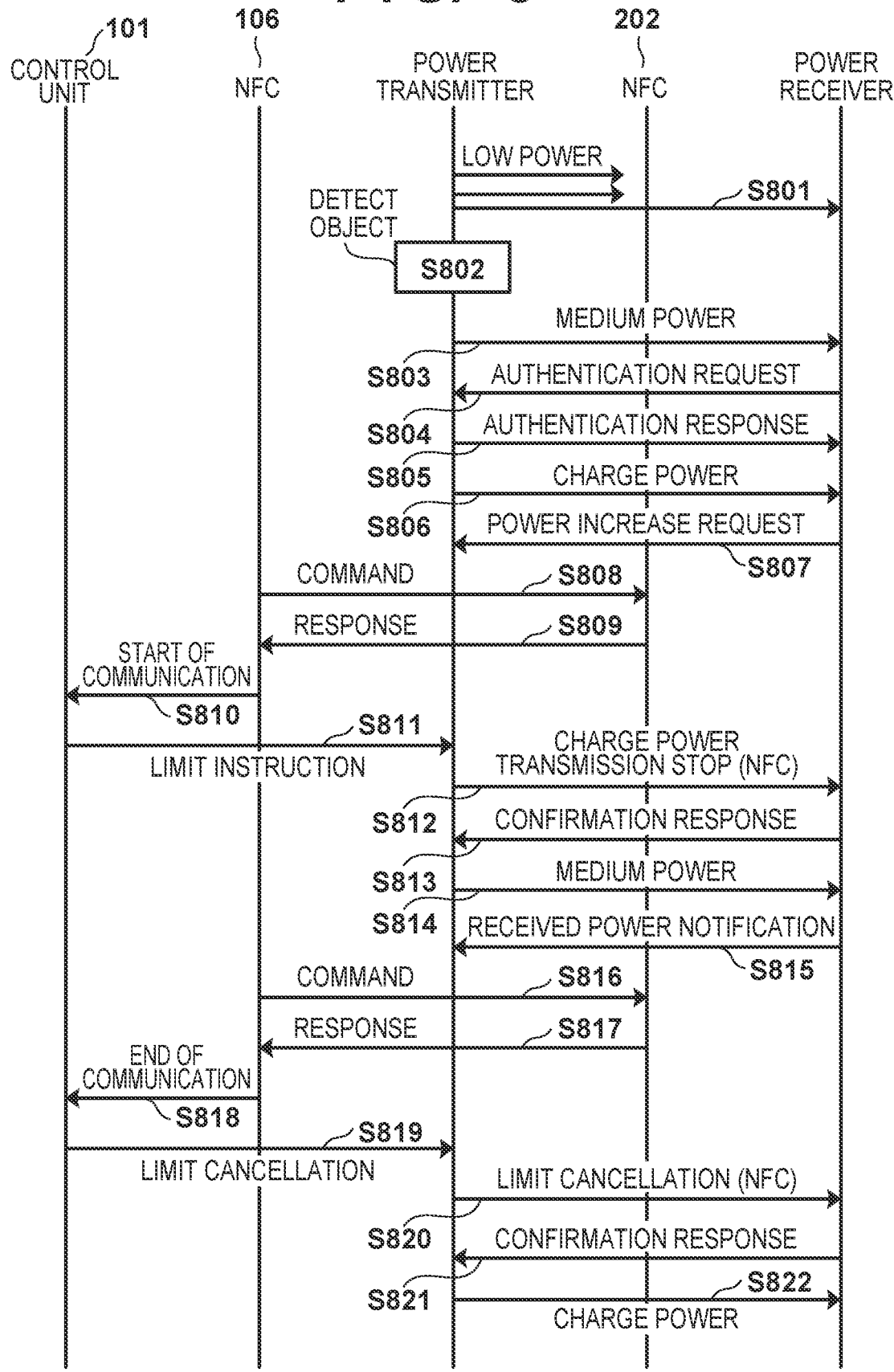
FIG. 8 is a sequence chart showing an example of the procedure of processing in a wireless power transmission system.

The procedure of processing executed by the power transmission apparatus 100 and the power receiving apparatus 200 as described above will be described next with reference to FIGS. 5A, 5B, 6, 7, and 8. Note that for the sake of simplicity of the description, the power transmission unit 103 and the communication unit 104 of the power transmission apparatus 100 will collectively be referred to as a power transmitter, and the power reception unit 205 and the communication unit 204 of the power receiving apparatus 200 will collectively be referred to as a power receiver here. FIGS. 5A, 5B, and 6 are flowcharts showing an example of the procedure of processing executed by the power transmitter and the control unit 101 in the power transmission apparatus 100. FIG. 7 is a flowchart showing an example of the procedure of processing executed by the power receiver in the power receiving apparatus 200. FIG. 8 is a sequence chart showing the procedure of processing executed between the power transmission apparatus 100 and the power receiving apparatus 200.

In this embodiment, when both a condition that NFC communication is already started or may be started and a condition that authentication of the power transmitter and the power receiver of the wireless power transmission system succeeds are satisfied, the power transmitter performs control to limit transmission power. The procedure of processing of the power transmitter and the control unit 101 of the power transmission apparatus 100 and the procedure of processing of the power receiver of the power receiving apparatus 200 will be described first, and after that, an example of the operation of the system will be described below Procedure of Processing of Power Transmitter and Control Unit The procedure of processing of the power transmitter and the control unit 101 of the power transmission apparatus 100 will be described first with reference to FIGS. 5A, 5B, and 6.

Here, the processing shown in FIGS. 5A and 5B can be started when the power transmission unit 103 of the power transmission apparatus 100 is powered on. Note that the processing shown in FIGS. 5A and 5B can be implemented when the power transmission unit 103 executes a program stored in the internal memory (not shown) of the power transmission unit 103. In addition, the processing shown in FIG. 6 can be started when the control unit 101 of the power transmission apparatus 100 is powered on. Note that the processing shown in FIG. 6 can be implemented when the control unit 101 executes a program stored in the memory 108 of the power transmission apparatus 100. Furthermore, some or all of steps shown in the flowcharts of FIGS. 5A, 5B, and 6 may be implemented by hardware such, for example, as an ASIC (Application Specific Integrated Circuit).

In this embodiment, when an object such as the power receiving apparatus 200 is placed within a predetermined power-transmittable range during repetitive sending of low power, as indicated by 400 in FIG. 4, the power transmitter detects the object in the above-described way (step S501) and starts sending the medium power (step S502). After that, the power transmitter determines whether a charge power transmission limit instruction is received from the control unit 101 (step S503). If the instruction is received (YES in step S503), the process advances to step S510. If the instruction is not received (NO in step S503), the process advances to step S504. The limit instruction is, for example, information representing that transmission power is limited to protect NFC communication. Details of processing of sending the limit instruction by the control unit 101 will be described later. Generally speaking, the charge power transmission limit instruction is a signal sent when NFC communication is being performed or is to be performed. That is, if the power transmitter detects an object in a state in which NFC communication is being performed or is to be performed, the process advances to step S510. If an object is detected in a state in which NFC communication is not being performed or is not to be performed, the process advances to step S504.

In step S504, the power transmitter determines whether an authentication request is received during a period in which, for example, medium power is sent. If an authentication request is not received (NO in step S504), the power transmitter determines that the detected object is not the power receiving apparatus. Additionally, in this case, since it is determined in step S503 that a limit instruction is not received, the power transmitter recognizes at least that it is not in a state in which NFC communication is performed. For this reason, the power transmitter causes the output unit 109 to do an error display representing that power transmission cannot be started (step S516) and ends the processing. Note that as the error display here, any display may be done as long as it is display different from display representing that the power transmitter is in a state in which charge power transmission can be started. Here, if an authentication request is not received in step S504, the power transmitter can recognize that the detected object is a foreign body. This is because if the detected object is a foreign body, neither NFC communication with the power transmission apparatus 100 nor transmission of an authentication request is performed.

On the other hand, if an authentication request is received (YES in step S504), the power transmitter transmits an authentication response to the authentication request (step S505). In an example, authentication succeeds when the power receiving apparatus 200 receives the authentication response. For this reason, the power transmitter starts charge power transmission (step S506). After that, the power transmitter monitors whether the charge is completed (step S507). During the time in which the charge is not completed (NO in step S507), the power transmitter monitors whether a limit instruction from the control unit 101 is not received (step S508). On the other hand, upon determining that the charge is completed (YES in step S507), the power transmitter executes processing for charge completion as needed (step S509) and ends the processing. Here, the power transmitter can determine that the charge has ended when a notification representing that the charge is completed is received from the power receiving apparatus 200 or when the power receiving apparatus 200 is removed from the range in which power can be transmitted from the power transmission apparatus 100.

Upon receiving the limit instruction from the control unit 101 during the time in which the charge is not completed (YES in step S508), the power transmitter notifies the power receiver of the power receiving apparatus 200 of a charge power transmission stop (NFC) and limit the transmission power (step S512). Here, the charge power transmission stop (NFC) can be information used to clearly notify the power receiving apparatus 200 that the charge power transmission is stopped to protect the NFC communication. For example, the power transmitter can store an information element "NFC" as a reason code in the information to stop the charge power transmission and transmit it to the power receiver. When the power transmitter stores the reason code "NFC" as an information element in the charge power transmission stop (NFC) notification, the power receiver can clearly grasp that the charge power transmission is stopped to protect NFC communication. However, this can be any information, for example, information implicitly representing the contents as long as it allows the power receiving apparatus 200 to understand that the charge power transmission is stopped to protect NFC communication. In addition, limit of the transmission power can mean that the transmission power is decreased to power that does not influence NFC communication or that have an influence of a predetermined level or less. For example, in this embodiment, since the electromagnetic wave sent by the medium power has a sufficiently small influence (of a predetermined level or less) on NFC communication, the power transmitter decreases the transmission power to the medium power. This can prevent the NFC communication from being impeded by the influence of wireless power transmission.

After that, the power transmitter waits for a limit cancel instruction from the control unit 101 (step S513). Here, the limit cancel instruction can be information that permits the power transmitter to cancel the state in which transmission of the charge power is limited, and lower power (for example, medium power) is transmitted. Upon receiving the limit cancel instruction from the control unit 101 (YES in step S513), the power transmitter notifies the power receiver of limit cancel (NFC) and, after a confirmation response is received from the power receiver, resumes charge power transmission (step S514). After that, the power transmitter advances the process to step S507 and continues the above-described processing until the change ends or an error termination occurs.

On the other hand, if the limit cancel instruction is not received from the control unit 101 for a predetermined period (NO in step S513), the power transmitter can notify an error and end the processing (step S515). This error can occur in a case in which, for example, the control unit 101 cannot correctly recognize the end of NFC communication. Note that this error may be notified even in a case in which NFC communication is performed simply for a long time. This can notify the user that charge cannot be performed because of execution of NFC communication. Note that the example of FIGS. 5A and 5B shows a case in which the processing ends after the notification of the error. However, the present invention is not limited to this. For example, if NFC communication is simply prolonged, charge cannot be performed at that point of time. However, if charge can be resumed in accordance with the end of NFC communication, the process may return to step S513 after an error is displayed.

If the power transmitter receives the limit instruction from the control unit 101 in step S503, that is, at the timing when the object is detected, and sending of medium power is started (YES in step S503), the power transmitter waits for reception of an authentication request as in step S504 (step S510). Here, a case in which an authentication request is not received (NO in step S510) can be a case in which a device that has the NFC communication function but does not have the power reception function for wireless power transmission is placed on the power transmission apparatus 100. That is, in this state, NFC communication is performed, but wireless power transmission cannot be performed. In this case, the power transmitter directly ends the processing without displaying an error. This makes it possible to prevent a device that performs NFC communication without needing power reception by wireless power transmission from performing unnecessary error display when the device is placed on the power transmission apparatus 100 and prevent usability from deteriorating. Here, since the timing at which NFC communication is executed and the timing at which the power transmitter transmits medium power (performs authentication processing) are asynchronous, authentication processing for wireless power transmission can be performed before the NFC communication. In this case, since the control unit 101 confirms whether NFC communication is started when an authentication request is not received, the power transmitter may cause the output unit 109 to wait for error display for a predetermined time. For example, the power transmission apparatus 100 may activate the timer 107 after determining that a foreign body (NFC tag) exists within power-transmittable range. If the start of NFC communication is recognized when timeout has occurred, the output unit 109 is not caused to display an error. Otherwise, the output unit 109 may be caused to display an error. In addition, if an authentication response is not received for a predetermined period after the NFC communication ends, and the limit cancel (NFC) notification is transmitted, the power transmitter may cause the output unit 109 to display an error. This can output a warning to the user in a case in which the user of the NFC tag leaves the NFC tag even after the end of NFC communication.

On the other hand, if an authentication request is received (YES in step S510), the power transmitter transmits an authentication response to the power receiving apparatus 200 (step S511). However, here, since the limit instruction is received from the control unit 101, the power transmitter notifies the power receiving apparatus 200 of a charge power transmission stop (NFC) without performing charge power transmission and only performs sending of limited power (for example, medium power) (step S512). This makes it possible to perform wireless power transmission without any influence of charge power on the quality of NFC communication. Subsequent processing is the same as the above-described processing. That is, upon receiving the limit cancel instruction from the control unit 101 (YES in step S513), the power transmitter starts charge power transmission.

Sending processing of a charge power transmission limit instruction and a limit cancellation by the control unit 101 will be described here with reference to FIG. 6. Upon detecting that communication by the NFC unit 106 is performed (step S601), the control unit 101 sends a charge power transmission limit instruction to the power transmitter to protect NFC communication (to perform transmission/reception without errors) (step S602). After that, in accordance with the end of the communication by the NFC unit 106 (YES in step S603), the control unit 101 sends a limit cancellation to the power transmitter (step S604). That is, the control unit 101 sends the charge power transmission limit instruction to the power transmitter when communication by the NFC unit 106 is executed, and after that, instructs the power transmitter to cancel the limit in accordance with the end of the communication. Note that the control unit 101 may continuously send the charge power transmission limit instruction at a predetermined interval during execution of the communication by the NFC unit 106. In this case, in accordance with the end of the communication, the control unit 101 may stop sending the limit instruction instead of the above-described limit cancel instruction. That is, in this case, the control unit 101 need not explicitly issue the limit cancel instruction. Note that in this case, a case in which sending of the limit instruction by the control unit 101 does not end in a predetermined period may be handled like the case in which the limit cancel instruction is not received in the determination of step S513 described above.

Procedure of Processing of Power Receiver

The procedure of processing of the power receiver will be described next with reference to FIG. 7. Here, the processing shown in FIG. 7 can be started when the control unit 201 of the power receiving apparatus 200 is powered on. Note that the processing shown in FIG. 7 can be implemented when the control unit 201 executes a program stored in the memory (not shown) of the power receiving apparatus 200. In addition, some or all of steps shown in the flowchart of FIG. 7 may be implemented by hardware such as, for example, an ASIC.

In this processing, first, when the power receiving apparatus 200 exists within the power-transmittable range of the power transmission apparatus 100, as described above, sending of medium power from the power transmission apparatus 100 is started. Upon receiving the medium power (step S701), the power receiver transmits, to the power transmitter, an authentication request including the wireless power transmission standard or standard version supported by the power receiving apparatus 200, the device identification information of the power receiving apparatus 200, and the like (step S702). After that, the power receiver receives an authentication response from the power transmitter (step S703). In an example, at this point of time, the authentication between the power transmitter and the power receiver succeeds. The power receiver then starts power reception from the power transmitter (step S704).

At this time, the power receiver determines whether it is notified of a charge power transmission stop (NFC) by control communication from the power transmitter (step S705). If the power receiver is notified of a charge power transmission stop (NFC) (YES in step S705), it stops power supply to a load (for example, battery). The power receiver then transmits a received power notification including information about received power to the power transmitter at a predetermined time interval (step S706) without transmitting a transmission power increase request until a limit cancellation (NFC) is received (YES in step S707). Note that the received power notification need only be information about power received by the power receiver, and may be a voltage value received by the power receiver or may be a current value. After that, when a limit cancellation (NFC) is received from the power transmitter (YES in step S707), charge power is then sent, and the power receiver receives the power. The power receiver can transmit a power increase request to request the power transmitter to increase the transmission power based on the power consumption variation of the load (step S708).

On the other hand, even if the power receiver is not notified of a charge power transmission stop (NFC) (NO in step S705), charge power is then sent, and the power receiver receives the power. The power receiver transmits a power increase request to request the power transmitter to increase the transmission power based on the power consumption variation of the load (step S708). Then, the power receiver determines whether to complete the charge (step S709). The determination here can be performed based on, for example, whether the battery remaining amount of the battery 206 is a predetermined value or more or whether a full charge is done. That is, if the battery remaining amount is a predetermined value or more or if a full charge is done, the power receiver can determine to end the charge. Note that the predetermined value may be set by, for example, the user, may be set in advance, or may be determined by another method. Alternatively, the determination here may be performed by determining whether the total amount of power received by the battery 206 reaches a predetermined value. That is, if the total amount of received power reaches a predetermined value, the power receiver can determine to end the charge.

Upon determining to complete the charge (YES in step S709), the power receiver executes charge end processing as needed (step S710) and ends the processing. On the other hand, upon determining not to complete the charge (NO in step S709), the power receiver returns the process to step S705 to continue the charge without transmitting a power increase request during execution of the NFC communication (while interrupting the charge during the time) while monitoring a charge power transmission stop (NFC) from the power transmitter. Note that even during the time in which the NFC communication is not performed, if the power receiver can receive power by an electromagnetic wave of a predetermined intensity, the power increase request in step S708 need not be transmitted, and a power reduction request to reduce power may be transmitted. That is, the power receiver can request the power transmitter to increase/decrease power such that power necessary for charge of the battery 206 can be obtained.

Note that at least some of the flowcharts shown in FIGS. 5A, 5B, 6, and 7 may be implemented by hardware. To implement the processing by hardware, for example, a dedicated circuit can be automatically generated from a program configured to implement each step onto an FPGA using a predetermined compiler. FPGA is the acronym of Field Programmable Gate Array. Like the FPGA, a Gate Array circuit may be formed and implemented as hardware.

Procedure of Processing in System

The procedure of processing performed when NFC communication is started during power transmission from the power transmitter to the power receiver by wireless power transmission will be described here with reference to FIG. 8. If the power receiving apparatus 200 is placed within the power-transmittable range during repetitive sending of low power (step S801), the power transmitter detects an object in the above-described way (step S802) and starts sending medium power (step S803). When the medium power is sent as described above, the power transmitter determines whether a limit instruction is received from the control unit 101. Since a limit instruction is not received at this point of time, the power transmitter waits for an authentication request from the power receiver. In accordance with reception of the medium power, the power receiver transmits the authentication request to the power transmitter (step S804).

Upon receiving the authentication request from the power receiver, the power transmitter transmits an authentication response as a response (step S805), and the power receiver receives the authentication response. Since the authentication between the power transmitter and the power receiver succeeds at this point of time, the power transmitter starts power transmission for charge (step S806), and the power receiver starts receiving the power. Here, the power transmission apparatus 100 can, for example, cause the output unit 109 to do display representing that the power transmitter can start charge power transmission. In addition, the power receiving apparatus 200 can cause the output unit 207 to do display representing that the battery 206 can be charged or is being charged after the authentication between the power transmitter and the power receiver succeeds. At this time, the power receiver determines whether it is notified of a charge power transmission stop (NFC) by control communication from the power transmitter. Since the notification is not performed at this point of time, the power receiver transmits a power increase request to request the power transmitter to increase the transmission power (step S807). Upon receiving the power increase request, the power transmitter transmits charge power based on the power increase request. After that, the power receiver can request the power transmitter to increase or decrease the power in accordance with power needed to charge the battery that is a load in the power receiving apparatus 200.

Assume here that the NFC unit 202 that is the NFC tag function of the power receiving apparatus 200 returns a response to a command (step S808) repetitively transmitted by the NFC unit 106 that is the NFC reader/writer function of the power transmission apparatus 100 (step S809).

The NFC unit 106 correctly demodulates the response from the NFC unit 202 and transmits, to the control unit 101, a communication start notification representing that there is a possibility that an NFC tag is detected (step S810). The communication start notification is transmitted when there is a possibility that the NFC unit 106 detects an NFC tag. The communication start notification can be issued in a case in which some notification that can be a response is received, but demodulation has failed in addition to a case in which the response from the NFC unit 202 is correctly demodulated, as described above.

When the NFC communication is detected by the communication start notification, the control unit 101 transmits a limit instruction representing that transmission power is limited to the power transmitter to protect the NFC communication (to perform transmission/reception without errors) (step S811). Upon receiving the limit instruction, the power transmitter stops charge power transmission. For this purpose, the power transmitter notifies the power receiver of a charge power transmission stop (NFC) explicitly or implicitly representing that the charge power transmission is ended to protect the NFC communication (step S812). Upon receiving a confirmation response to the notification of the charge power transmission stop (NFC) from the power receiver (step S813), the power transmitter limits the transmission power to medium power (step S814). At this point of time, since the charge power is limited to the medium power, subsequent NFC communication is protected, and NFC communication free from errors can be achieved.

After the charge power transmission stop (NFC) is received, the power receiver transmits a received power notification including information about received power to the power transmitter at a predetermined time interval without transmitting a power increase request until a limit cancellation (NFC) is received (step S815).

Note that after the power transmitter transmits the charge power transmission stop (NFC) notification until it cancels the limit, the power receiver can transmit the received power notification to the power transmitter at a predetermined time interval (step S815), and the power transmitter can transmit a confirmation response to the notification (not shown). This signal exchange can be used for confirmation for confirming whether the power receiver exists within the power-transmittable range of the power transmitter. For this reason, the information transmitted by the power receiver need not always be the received power notification. For example, the power receiver may transmit a signal that is information about the power increase/decrease request and sets the increase/decrease amount to "0", and may further transmit a signal to which an information element representing that the increase/decrease amount is set to "0" to protect NFC communication is added. In addition, the power transmitter may store an information element representing that the charge power transmission is stopped to protect NFC communication may be stored in the information element of the confirmation response and transmit it.

After that, the NFC unit 106 transmits a command to the NFC unit 202 (step S816), the NFC unit 202 transmits a response to the NFC unit 106 (step S817), and the series of communications of NFC thus ends. Then, the NFC unit 106 notifies the control unit 101 that the series of NFC communications has ended (step S818). Upon detecting the end of NFC communication by receiving the notification, the control unit 101 instructs the power transmitter to cancel the limit (step S819).

Upon receiving the limit cancellation from the control unit 101, the power transmitter transmits a limit cancel (NFC) notification to the power receiver (step S820), and after a confirmation response is received from the power receiver (step S821), resumes charge power transmission (step S822). Upon receiving the limit cancellation (NFC), the power receiver subsequently outputs a power increase request based on the power consumption variation of the load from then on.

As described above, in this embodiment, the transmission power is limited during execution of NFC communication. It is therefore possible to prevent, for example, a harmonic or out-of-band radiation from interfering with the NFC communication and impeding the NFC communication. Additionally, in this embodiment, the description has been made assuming that the power receiving apparatus 200 includes the NFC unit 202 and the power reception unit 205. However, the power receiving apparatus 200 need not always include the NFC unit 202. Even in this case, for example, even if an NFC tag different from the power receiving apparatus 200 is placed on the power transmission apparatus 100, the same effect as described above can be obtained.

In addition, after the charge power transmission stop (NFC) notification is received until the limit cancel (NFC) notification is received, the power receiver performs control communication. Hence, the power receiver can cause the output unit 207 to continuously output information representing that the battery 206 can be charged. This can prevent usability from being deteriorated by turning off the charge display of the power receiving apparatus 200 during NFC communication.

Furthermore, in the above-described embodiment, after the stop of the charge power transmission, the power transmitter transmits power (medium power) to activate at least the control unit 201 and the communication unit 204 of the power receiving apparatus. Since the authentication information of the power receiver can be saved in the memory 108, the power transmission apparatus 100 can quickly resume charge power transmission after the limit cancellation without performing authentication of the power receiver again.

In addition, the above-described limit instruction need not always be the information as described above because it is information used by the power transmitter to limit the transmission power based on it. For example, the limit instruction may be information representing the NFC communication start.

Furthermore, in the above description, the power receiver transmits the authentication request to the power transmitter. However, the present invention is not limited to this, and the power transmitter may transmit the authentication request, and the power receiver may transmit the authentication response. Furthermore, an information element representing charge power transmission is not performed to protect NFC communication may be stored in the authentication request transmitted by the power transmitter.

Additionally, in the above-described embodiment, the power transmission antenna 105 is arranged to be surrounded by the antenna 300 of the NFC unit 106, the power reception antenna 203 and the NFC antenna of the NFC unit 202 in the power receiving apparatus 200 also have the same relationship as described above. However, the present invention is not limited to this, and another configuration may be employed. For example, the NFC antenna may be arranged to be surrounded by the power transmission antenna or the power reception antenna.

In addition, the NFC unit 106 transmits a communication start notification to the control unit 101 in a case in which there is a possibility that an NFC tag is detected. However, the NFC unit 106 may transmit the communication start notification to the control unit 101 only in a case in which demodulation of NFC communication fails. This makes it possible to simultaneously implement NFC communication and charge power transmission without limiting the charge power transmission by the power transmitter when the NFC communication can correctly be transmitted/received even if the power transmitter is executing charge power transmission.

Additionally, in the above description, the control unit 101 exists independently of the power transmitter. However, they may be integrated. Similarly, a configuration in which the power transmission unit 103, the communication unit 104, and the control unit 101 are integrated or a configuration in which the NFC unit 106 is also integrated may also be used.

In addition, the power transmitter may transmit the charge power transmission stop (NFC) notification and also instruct the power receiver not to supply power to the load. The power receiving apparatus 200 stops power supply to the load based on the notification. The power consumed by the power receiving apparatus 200 and the power transmitted by the power transmitter can thus balance. For example, it is possible to prevent a phenomenon in which the power transmitter transmits medium power, but the power receiving apparatus 200 charges the battery (consumes power equal to or more than the medium power).

In addition, the power transmitter does not transmit power equal to or more than the medium power after it receives the limit instruction until it receives the limit cancellation. Upon receiving the charge power transmission stop (NFC) notification, the power receiver does not transmit the power increase request to the power transmitter until it receives the limit cancellation (NFC). However, even if the power increase request is received from the power receiver after the limit instruction is received from the control unit 101 until the limit cancellation is received, the power transmitter may reject it. This configuration is effective in a case in which, for example, the power receiver does not have a function of inhibiting transmission of the power increase request in accordance with reception of the charge power transmission stop (NFC) notification. In this case, although the power receiver transmits the power increase request based on the power consumption of the load, the power transmitter rejects the power increase request, thereby preventing interference with the NFC communication.

Second Embodiment

In the first embodiment, the configuration in which when the power transmission apparatus 100 detects that wireless communication such as NFC is performed, power transmission by wireless power transmission is limited has been described. In this embodiment, when a power receiving apparatus 200 detects that wireless communication such as NFC is being performed, it transmits a notification representing that the power transmission by wireless power transmission should be limited to a power transmission apparatus 100. An device configuration for performing such processing and the procedure of the processing will be described below.

Apparatus Configuration

Figure 9:
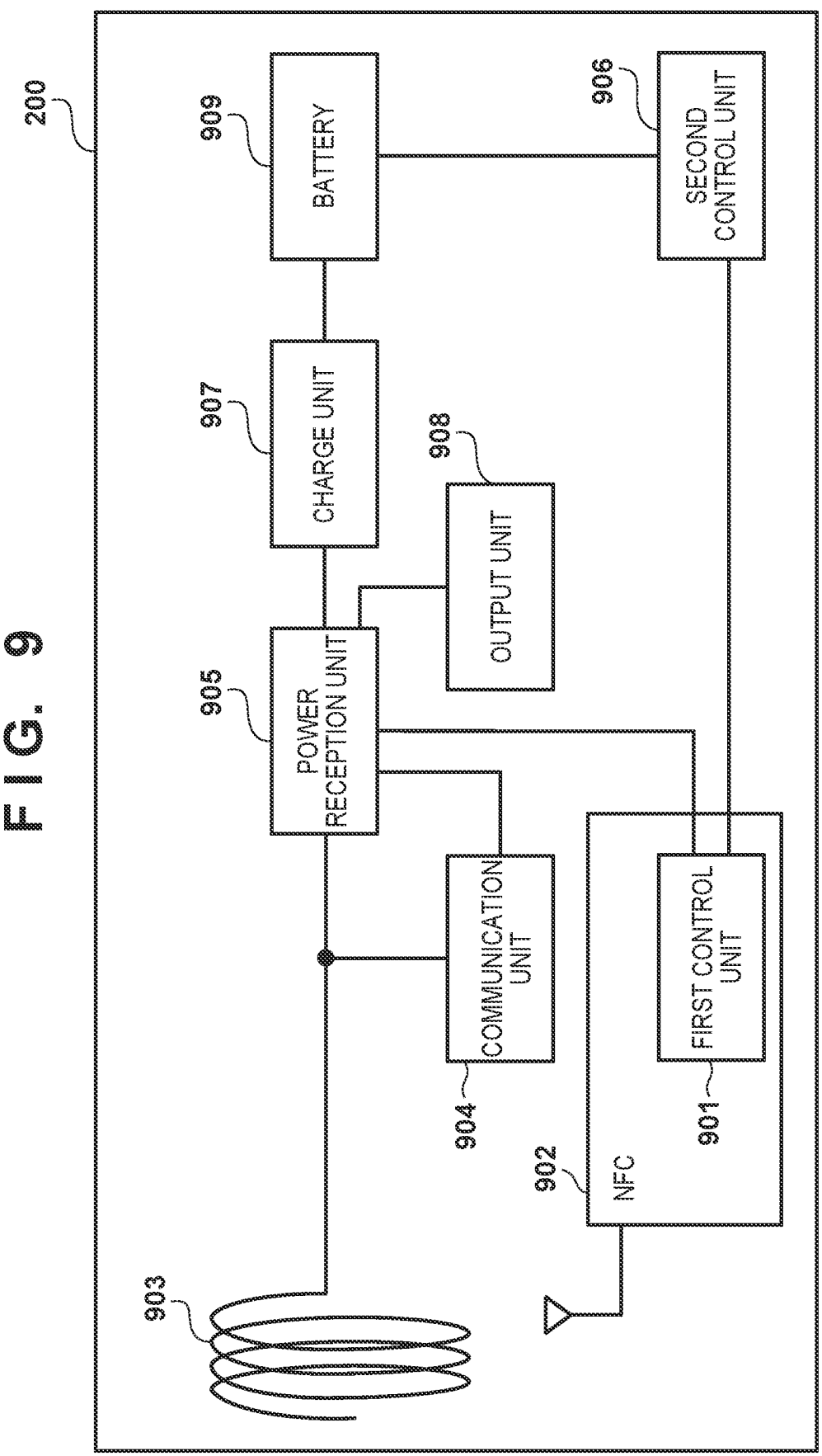
FIG. 9 is a block diagram showing another example of the configuration of the power receiving apparatus.

FIG. 9 is a block diagram showing an example of the configuration of the power receiving apparatus 200 according to this embodiment. Note that the configuration of the power transmission apparatus 100 is the same as in FIG. 1 according to the first embodiment, and a description thereof will be omitted here. In addition, the arrangement of a power transmission antenna 105 and an antenna 300 of an NFC unit 106 in the power transmission apparatus 100 and an example of power sent from a power transmission unit 103 of the power transmission apparatus 100 via the power transmission antenna 105 are also the same as in FIGS. 3 and 4.

The power receiving apparatus 200 includes, for example, a first control unit 901, an NFC 902, a power reception antenna 903, a communication unit 904, a power reception unit 905, a second control unit 906, a charge unit 907, an output unit 908, and a battery 909. In an example, the first control unit 901 exists inside the NFC 902 and is connected to the power reception unit 905 and the second control unit 906. The first control unit 901 can be operated by a DC voltage obtained by rectifying an electromagnetic wave of 13.56 MHz that the NFC 902 receives from the NFC unit 106 of the power transmission apparatus 100. The first control unit 901 controls the operation of the NFC 902 and transmits/receives information to/from the power reception unit 905 and the second control unit 906. The NFC 902 is an NFC tag complying with the NFC standard and performs communication complying with the NFC standard with the NFC unit 106 of the power transmission apparatus 100. In addition, the NFC 902 can be operated by power supplied from the NFC unit 106, like the first control unit 901. The communication of the NFC 902 is performed via an NFC antenna different from the power reception antenna 903.

The power reception antenna 903 is an antenna used to receive the electromagnetic wave sent from the power transmission apparatus 100. The power reception unit 905 obtains AC power by resonance that is caused in a circuit in the power reception unit 905 by the electromagnetic wave received by the power reception antenna 903. The power reception unit 905 then converts the AC power into DC power to AC power of a desired frequency and supplies the power after conversion to the battery 909 or the charge unit 907 that charges the battery. Note that the power reception unit 905 may supply the received power to a load for an application purpose other than charge of the battery 909. That is, the application purpose of the received power is not limited to charge, and the received power can be supplied to various loads.

The communication unit 904 performs control communication of wireless power transmission with the power transmission apparatus 100 via the power reception antenna 903 of the power receiving apparatus 200 (or via the power transmission antenna 105 of the power transmission apparatus 100). The communication unit 904 can operate by receiving power supplied from the power reception unit 905. If an AC voltage input from the power reception antenna 903 or a DC voltage converted from it exceeds a predetermined value, for example, if sufficiently power to activate the power reception unit 905 itself and the communication unit 904 is received, the power reception unit 905 performs control communication of wireless power transmission via the communication unit 904.

The battery 909 stores the power received by the power reception unit 905 and supplies, to the second control unit 906, power to operate the second control unit 906. The second control unit 906 can be, for example, a CPU that executes a control program stored in a memory (not shown) and controls the entire power receiving apparatus 200. The output unit 908 performs various kinds of outputs to the user. Here, the output by the output unit 908 includes at least one of a color change, blinking, and lighting of an LED, display on a screen, sound output by a speaker, a vibration output, and the like.

The power receiving apparatus 200 according to this embodiment transmits a notification representing that sending of charge power should be stopped to the power transmission apparatus 100 in a case in which NFC communication that may be influenced by wireless power transmission is started or may be started. Accordingly, the power transmission apparatus 100 reduces the power to be sent (to, for example, power equal to or less than medium power). This prevents an electromagnetic wave (for example, a harmonic) associated with wireless power transmission from interfering with NFC communication.

Procedure of Processing

Figure 10:
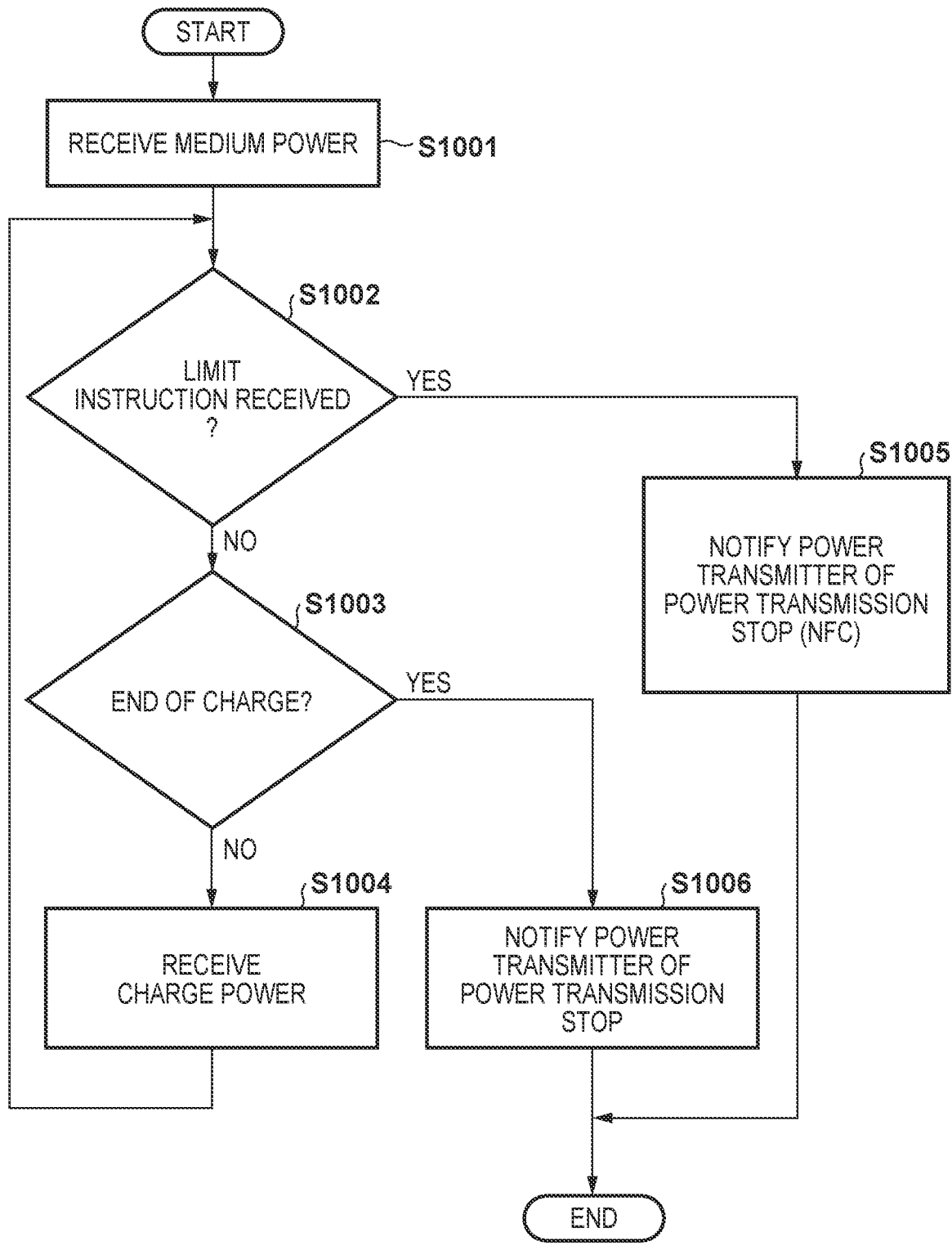
FIG. 10 is a flowchart showing an example of the procedure of processing executed by the power receiver.
Figure 11:
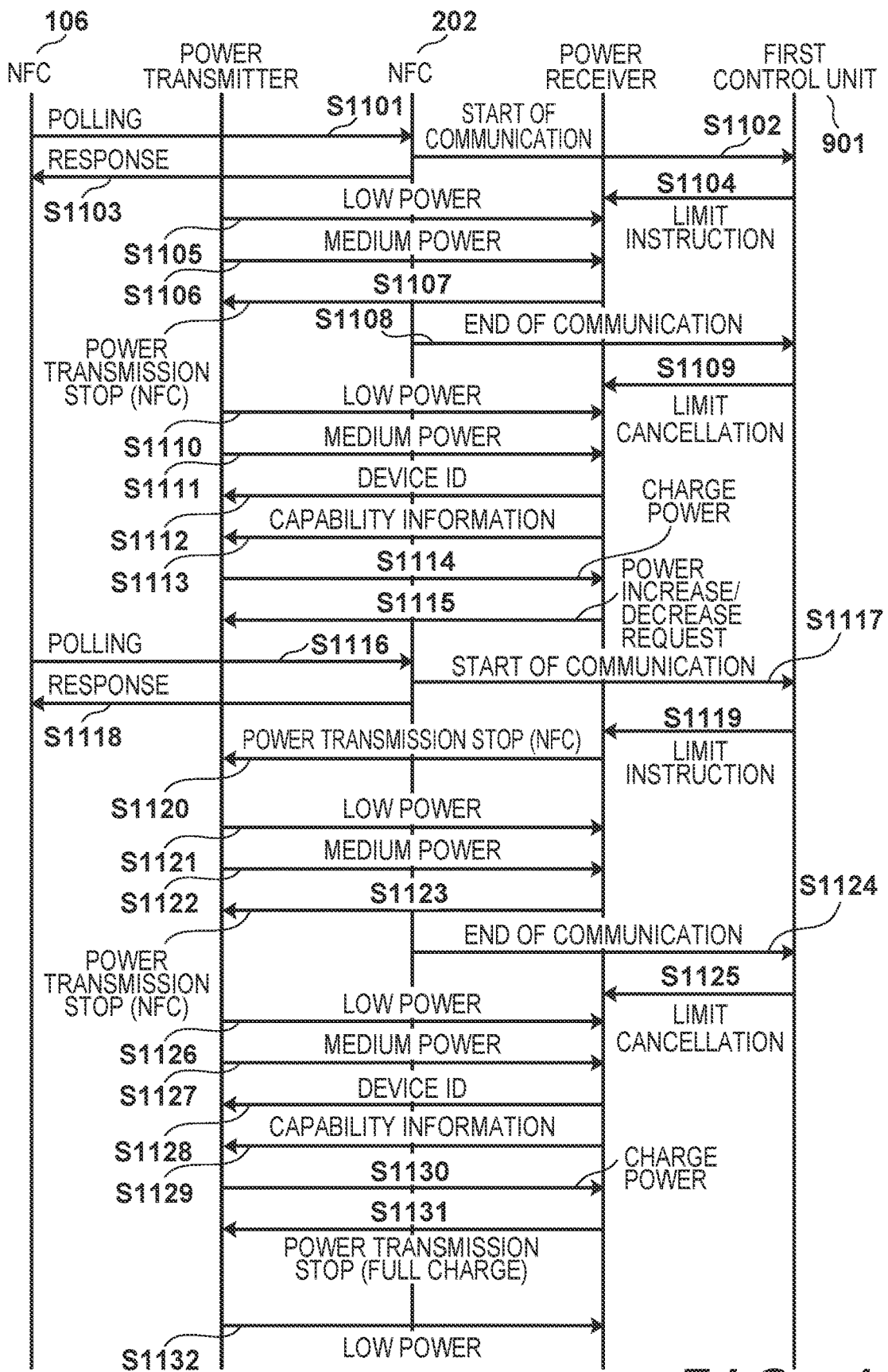
FIG. 11 is a sequence chart showing another example of the procedure of processing in the wireless power transmission system.

The procedure of processing executed by the system will be described next with reference to FIGS. 10 and 11. FIG. 10 is a flowchart showing the procedure of processing executed by the power reception unit 905 and the communication unit 904 of the power receiving apparatus 200. FIG. 11 is a sequence chart showing the procedure of processing executed between the power transmission apparatus 100 and the power receiving apparatus 200. Note that for the sake of simplicity of the description, the power transmission unit 103 and a communication unit 104 of the power transmission apparatus 100 will collectively be referred to as a power transmitter, and the power reception unit 905 and the communication unit 904 will collectively be referred to as a power receiver hereinafter.

Procedure of Processing of Power Receiver

The procedure of processing executed by the power receiver in the power receiving apparatus 200 will be described first with reference to FIG. 10.

Here, the processing shown in FIG. 10 can be started when the power receiver (the power reception unit 905 and the communication unit 904) of the power receiving apparatus 200 is powered on. Note that the processing shown in FIG. 10 can be implemented when the power receiver executes a program stored in the internal memory (not shown) of the power receiving apparatus 200. In addition, some or all of steps shown in the flowchart of FIG. 10 may be implemented by hardware such as, for example, an ASIC (Application Specific Integrated Circuit).

Note that to implement at least part of the processing shown in FIG. 10 by hardware, for example, a dedicated circuit can be automatically generated from a program configured to implement each step onto an FPGA using a predetermined compiler. FPGA is the acronym of Field Programmable Gate Array. Like the FPGA, a Gate Array circuit may be formed and implemented as hardware.

Upon receiving medium power sent from the power transmitter in accordance with the movement of the power receiving apparatus 200 into the power-transmittable range of the power transmission apparatus 100 (step S1001), the power receiver subsequently determines whether a limit instruction is received from the first control unit 901 (step S1002). If a limit instruction is received from the first control unit 901 (YES in step S1002), the power receiver notifies the power transmitter of a power transmission stop (NFC) (step S1005) and ends the processing. Here, the power transmission stop (NFC) is information that requests transmission stop of charge power and explicitly or implicitly represents that the request is done to protect the NFC communication, as described above.

On the other hand, if a limit instruction is not received from the first control unit 901 (NO in step S1002), the power receiver determines whether to end the charge (step S1003). Here, it can be determined whether to end the charge based on, for example, whether a full charge is done, whether the battery remaining amount is a predetermined value or more, or whether a predetermined amount of power is received, or the like. If the charge is not to be ended (NO in step S1003), the power receiver receives the charge power (step S1004) and returns the process to step S1002. The power receiver then continues reception of the charge power while monitoring whether the limit instruction is issued from the first control unit 901. If the charge is to be ended (YES in step S1003), the power receiver transmits to the power transmitter a power transmission stop notification representing a request of stop of power transmission by, for example, control communication (step S1006). Note that the power transmission stop notification here may include information representing the reason of the power transmission stop, for example, representing that a full charge is done, the battery remaining amount is a predetermined value or more, or reception of a predetermined amount of power is completed.

After the power transmission stop (NFC) is transmitted to protect NFC communication, the power receiver receives a limit cancel instruction from the first control unit 901 in accordance with the end of NFC communication. Note that the first control unit 901 may explicitly issue the limit cancel instruction. For example, the first control unit 901 may periodically issues the limit instruction during NFC communication and, after the end of the communication, stop the issue to implicitly notify the limit cancel instruction. In any case, after the limit cancel instruction is recognized, the power receiver waits for arrival of medium power from the power transmitter, and executes the processing from step S1002 again in accordance with reception of the medium power (step S1001).

Note that here, upon receiving the power transmission stop (NFC) notification, the power transmitter of the power transmission apparatus 100 stops sending the charge power or medium power. At this time, the power transmitter periodically continuously transmits, for example, low power. Note that the power transmitter can send the medium power again in a case in which, for example, the object detection result by the low power does not change, that is, the state in which it can be determined that the power receiving apparatus 200 exists in the vicinity does not change after the elapse of a predetermined period. At that time, the power receiver can execute the processing from step S1002 in accordance with reception of the medium power sent again (step S1001). That is, if the NFC communication continues, and the limit instruction is not canceled, the power transmitter transmits the power transmission stop (NFC) to the power transmitter again. If the limit instruction is canceled, the power transmitter receives the limit instruction again or receive the charge power until it is determined to end the charge.

Note that upon receiving the power transmission stop (NFC) notification, the power transmitter stops sending the charge power, but may continuously send the medium power. Accordingly, control communication between the power transmitter and the power receiver can be executed by sending the medium power that does not influence the quality of NFC communication. For example, the power transmitter can receive a predetermined signal from the power receiver at a predetermined time interval using the sent medium power and thus determine whether the power receiver exists within the power-transmittable range. Additionally, in this case, when the limit cancel instruction is received from the first control unit 901, the power receiver can notify the power transmitter of the limit cancellation by the control communication. Note that in this case, the power receiver determines, after the process of step S1005 shown in FIG. 10, whether the limit cancel instruction is received. If the limit cancel instruction is not received, the power receiver returns the process to step S1001. If the limit cancel instruction is received, the power receiver can transmit the limit cancel instruction to the power transmitter and then advances the process to step S1003 or S1004. Note that in a state in which reception of the charge power is possible (that is, in a case in which NFC communication is not performed), the power receiver can transmit, to the power transmitter, a power increase/decrease request to request an increase or decrease of the sent power.

Procedure of Processing of System

The procedure of processing executed by the power transmitter and the NFC unit 106 of the power transmission apparatus 100 according to this embodiment and the first control unit 901, the NFC 902, and the power receiver of the power receiving apparatus 200 will be described next with reference to FIG. 11. Here, the reader/writer (NFC unit 106) of NFC executes a host application using NFC with the NFC tag (NFC 902) as the communication partner. To do this, the reader/writer sends, into air, an electromagnetic wave obtained by superimposing information (to be referred to as a "command" hereinafter) about a register to read/write in registers existing in the NFC tag on power with which at least the NFC tag can operate. In this embodiment, the electromagnetic wave including the power and the command will be referred to as "polling". Upon receiving the polling, the NFC tag activates the first control unit 901, understands the command, and transmits a response that is a response to it.

In the processing example shown in FIG. 11, first, the NFC unit 106 transmits a polling via the NFC antenna (step S1101). The NFC 902 receives the polling, correctly demodulates the command, and notifies the first control unit 901 of "communication start" representing that NFC communication is started using the understanding of the intention of communication start indicated by the NFC unit 106 as a trigger (step S1102). In response to the polling, the NFC 902 transmits a response to the NFC unit 106 (step S1103).

Upon receiving the communication start notification in step S1102, the first control unit 901 notifies the power receiver of a limit instruction representing that transmission power should be limited to protect NFC communication (step S1104). The limit instruction may be notified by on/off-controlling (raising/lowering the voltage) the signal line that connects the power reception unit 905 and the first control unit 901.

Here, in the power transmission apparatus 100, the power transmitter periodically sends low power, and a state in which the power receiver can receive the send power (that is, the power receiving apparatus 200 enters the power-transmittable range of the power transmission apparatus 100) is set (step S1105). In this case, the power transmitter determines that an object exists within the power-transmittable range and sends medium power (step S1106).

Upon receiving the medium power, the power receiver determines whether the limit instruction is received from the first control unit 901. In this case, since the limit instruction is received in step S1104, the power receiver notifies the power transmitter of the power transmission stop (NFC) by control communication (step S1107). Here, the power transmission stop (NFC) is information that requests transmission stop of charge power and represents that the request is done to protect the NFC communication, as described above. The power transmitter inhibits transmission of charge power in accordance with the request of power transmission stop (NFC). Note that at this time, the power transmitter may continuously send the medium power or may stop sending of the medium power. Note that here, the power transmitter stops sending of the medium power as well.

Here, upon determining that the NFC communication ends, the NFC 902 notifies the first control unit 901 of information representing the end of communication of NFC (step S1108). Here, upon determining that, for example, read/write for the register indicated by the command in the polling and transmission of the response end, the NFC 902 can determine that the NFC communication ends. Upon receiving the notification of the communication end, the first control unit 901 transmits, to the power receiver, a limit cancellation as a notification to cancel the state in which the transmission power is limited to protect the NFC communication (step S1109).

Next, the power transmitter sends low power and medium power, as in steps S1105 and S1106 (steps S1110 and S1111). When the power receiver receives the medium power, the limit instruction is canceled at this point of time. For this reason, the power receiver then determines, by, for example, confirming the battery remaining amount, whether to end the charge. If the charge is not to be ended, the power receiver transmits a device ID representing the identification information of the power receiver itself to the power transmitter (step S1112). Then, the power receiver transmits, to the power transmitter, capability information including, for example, the maximum value of power supplied to the charge unit 907 (step S1113). After receiving the capability information, the power transmitter sends charge power to the power receiver (step S1114). Upon receiving the charge power, the power receiver supplies the power to the battery 909 via the charge unit 907 and also monitors whether the power is suitable for charge and transmits a power increase/decrease request for requesting power transmission of appropriate power to the power transmitter (step S1115). The power receiver may transmit the power increase/decrease request not only once but twice or more as needed.

Here, assume that the NFC unit 106 transmits polling while the power transmitter sends the charge power (step S1116). Upon receiving the polling, the NFC 902 notifies the first control unit 901 of the communication start, as in step S1102 (step S1117). Upon receiving the notification of the start of the NFC communication, the first control unit 901 issues a limit instruction to the power receiver (step S1119). In addition, the NFC 902 transmits a response to the polling to the NFC unit 106 (step S1118).

Here, at the timing at which the polling is transmitted in step S1101, the charge power is not transmitted from the power transmitter. Hence, the NFC 902 can correctly demodulate the command in the polling. However, at the timing at which the polling is transmitted in step S1116, the charge power is transmitted during power transmission. For this reason, the waveform of the command in the polling is distorted by a noise component included in the charge power, and the NFC 902 may be unable to correctly demodulate the command. If demodulation of the command in the polling fails, the NFC 902 cannot correctly determine whether communication is started. However, the operating frequency of the power transmitted by the power transmitter several hundred kHz, and the operating frequency of NFC is 13.56 MHz, as described above. Since the different operating frequencies are used, it is unlikely that the NFC 902 and the first control unit 901 of the power receiving apparatus 200 are activated by the power transmitted by the power transmitter. That is, when the NFC 902 and the first control unit 901 are activated, the NFC 902 can determine that the polling is received, that is, the NFC communication is started. In summary, the NFC 902 can determine that the NFC communication is started not only in a case in which the NFC 902 can correctly demodulate the command but also in a case in which the NFC 902 and the first control unit 901 are activated.

Referring back to FIG. 11, upon receiving the limit instruction, the power receiver transmits the power transmission stop (NFC) to the power transmitter (step S1120). Since the power transmission stop is requested, the power transmitter stops transmission of the charge power and sends low power at a predetermined time interval (step S1121). Note that in a case in which, for example, the result of object detection result obtained by sending the low power does not change, as described above, the power transmitter can determine that the power receiver continuously exists within the power-transmittable range. Hence, if a predetermined period has elapsed in this state, the power transmitter can send medium power (step S1122). However, at this point of time, the power receiver does not receive the limit cancellation from the first control unit 901. Hence, in accordance with reception of the medium power, the power receiver can transmit the power transmission stop (NFC) to the power transmitter again (step S1123). After that, when the NFC communication ends, and the NFC 902 notifies the first control unit 901 of it (step S1124), the first control unit 901 notifies the power receiver of the limit cancellation (step S1125). The subsequent processes of steps S1126 to S1130 are the same as the processes of steps S1110 to S1114, and a description thereof will be omitted.

After that, when the charge is to be ended because, for example, the battery is fully charged, the power receiver transmits a notification to request power transmission stop to the power transmitter (step S1131). Note that the power transmission stop notified by the power receiver may include information representing the reason of power transmission stop. For example, in this example, the power receiver transmits a message including information representing that the full charge is the reason to request the power transmission stop. Upon receiving the power transmission stop request, the power transmitter ends sending of the charge power (and the medium power) and then resumes periodical sending of low power again (step S1132).

As described above, the power receiving apparatus 200 according to this embodiment notifies the power transmission apparatus 100 of the charge power transmission stop (NFC) in a case in which NFC communication is started or may be started. Note that when the NFC 902 and the first control unit 901 are activated, the power receiving apparatus 200 can determine that NFC communication is started or may be started. This can inhibit the power transmission apparatus 100 from transmitting charge power and prevent the electromagnetic wave of wireless power transmission from interfering with the NFC communication.

Note that in the example shown in FIG. 11, an example in which transmission of not only the charge power but also the medium power is stopped when the power transmitter receives the power transmission stop (NFC) has been described. In this case, since power supply to the power receiver is interrupted in accordance with the stop of transmission of the charge power and the medium power, the operation of the power receiver can be reset. In this case, the power transmitter and the power receiver execute the sequence of wireless power transmission (for example, the processes of steps S1128 and S1129) when resuming the transmission/reception of the charge power. On the other hand, as described above, when the power transmission stop (NFC) is received, the power transmitter stops sending of the charge power but may maintain sending of the medium power. Accordingly, since the power is continuously supplied to the power receiver, the power receiver can maintain predetermined communication such as existence confirmation with the power transmitter. Hence, in accordance with, for example, reception of a communication cancellation from the first control unit 901 in step S1125, the power receiver can immediately transmit the power increase request to the power transmitter. The power receiver can thus receive the charge power at an early time. In addition, instead of transmitting the power transmission stop (NFC) to the power transmitter, the power receiver may request by the power increase/decrease request as in step S1114 such that the power sent from the power transmitter has the same level as the medium power.

Additionally, in this embodiment, the NFC 902 determines the start and the end of NFC communication. However, this determination may be done by the power receiver. For example, when the power receiver receives medium power and is activated, it can observe the power supply voltage (not shown) of the NFC 902 or the first control unit 901. Upon detecting the voltage value that activates the NFC 902 or the first control unit 901, the power receiver can execute predetermined processing (that is, processing performed in a case in which the limit instruction is received in the above-described example) according to determining that communication is started. In addition, the start and the end of NFC communication may be determined by detecting a fine signal of NFC detectable by the power reception antenna 903 and the power reception unit 905. The end of NFC communication may be determined by, for example, a timer (not shown) inside the power receiving apparatus 200. For example, as the setting value of the timer, a time in which at least one cycle of the operation from the start of reception of polling up to the end of transmission of a response can be performed is set. Accordingly, the power receiving apparatus 200 starts the timer upon determining that reception of polling is started, thereby determining at the expiration time of the timer that the NFC communication ends.

The power transmission method of the wireless power transmission system according to this embodiment is not particularly limited. For example, a magnetic field resonance method for transmitting power using coupling by the resonance of the magnetic field between the resonator (resonance element) of the power transmission apparatus 100 and the resonator (resonance element) of the power receiving apparatus 200 may be used. Alternatively, a power transmission method using an electromagnetic induction method, an electric field resonance method, a microwave method, a laser, or the like may be used.

Additionally, in the above description, processing performed in a case in which communication that is not associated with wireless power transmission is affected within the power-transmittable range of the wireless power transmission in the power transmission apparatus 100 has been described. Here, NFC communication is an example of communication affected by wireless power transmission, and another communication method may be used. For example, a Bluetooth® Low Energy (BLE) standard, Wi-Fi®, Zigbee®, or GPS may be used. Note that the wireless communication that can be affected by the wireless power transmission is not limited to communication between the power transmission apparatus 100 and the power receiving apparatus 200. That is, communication performed on the periphery of the power transmission apparatus 100 and the power receiving apparatus 200 can also be affected by the wireless power transmission. For this reason, upon detecting communication performed on the periphery, for example, the power receiving apparatus 200 according to the second embodiment can transmit, to the power transmission apparatus 100, a notification representing power sent by wireless power transmission should be limited. For example, when NFC communication is performed between the power transmission apparatus 100 and another device, the power receiving apparatus 200 can notify the power transmission apparatus 100 that power sent by wireless power transmission should be limited.

In addition, the control communication of the communication unit 104 or the communication unit 204 or 904 can be so-called in-band communication that is performed while being superimposed on the power transmitted from the power transmission antenna 105. However, the present invention is not limited to this. That is, the control communication may be out-band communication or may be performed by a Bluetooth® Low Energy (BLE) standard, Wi-Fi®, Zigbee®, or the like.

In addition, each of the power transmission apparatus 100 and the power receiving apparatus 200 may be an image input device such as an image capturing device (a camera, a video camera, or the like) or a scanner or may be an image output device such as a printer, a copying machine, or a projector. Furthermore, each of these devices may be a storage device such as a hard disk drive or a memory device, or an information processing device such as a personal computer (PC) or a smartphone.

It is possible to reduce interference of an electromagnetic wave of wireless power transmission with another wireless communication.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A power transmission apparatus comprising:
a power transmission unit configured to transmit power to a power receiving apparatus and to perform, with the power receiving apparatus, control communication associated with a control of the power transmission to the power receiving apparatus; and
a communication unit configured to perform communication,
wherein the power transmission unit limits transmission power to the power receiving apparatus in a case where the communication unit is performing communication that is not associated at least with control of power transmission to the power receiving apparatus, and
wherein, in the case where the communication unit performs the communication that is not associated at least with the control of the power transmission to the power receiving apparatus, the power transmission unit notifies the power receiving apparatus, via the control communication, that the transmission power to the power receiving apparatus is limited.

2. The power transmission apparatus according to claim 1, wherein, in a case where the transmission power to the power receiving apparatus is limited, the power transmission unit transmits the power to the power receiving apparatus using power that influences the communication by the communication unit at not more than a predetermined level.

3. The power transmission apparatus according to claim 1, wherein before the communication unit performs the communication that is not associated at least with the control of the power transmission to the power receiving apparatus, the power transmission unit notifies the power receiving apparatus, via the control communication, that the transmission power to the power receiving apparatus is limited.

4. The power transmission apparatus according to claim 1, wherein while the transmission power to the power receiving apparatus is limited, the power transmission unit performs the control communication with the power receiving apparatus.

5. The power transmission apparatus according to claim 1, wherein in a case where the transmission power to the power receiving apparatus is limited, the power transmission unit instructs, via the control communication, the power receiving apparatus not to supply the power to a load provided in the power receiving apparatus.

6. The power transmission apparatus according to claim 1, wherein, while the transmission power to the power receiving apparatus is limited, the power transmission unit does not increase the power even if the power receiving apparatus requests an increase of the power.

7. The power transmission apparatus according to claim 1, wherein, in a case where the communication unit ends the communication that is not associated with the control of the power transmission to the power receiving apparatus while the transmission power to the power receiving apparatus is limited, the power transmission unit cancels the limit.

8. The power transmission apparatus according to claim 1, wherein the communication unit performs the communication using an electromagnetic wave of a frequency different from a frequency of an electromagnetic wave used by the power transmission unit in the power transmission to the power receiving apparatus.

9. A control method of a power transmission apparatus including a power transmission unit and a communication unit, the method comprising:
causing the power transmission unit to wirelessly transmit power to a power receiving apparatus and to perform, with the power receiving apparatus, control communication associated with a control of the power transmission to the power receiving apparatus;
causing the communication unit to perform communication;
causing the power transmission unit to limit the power to be sent to the power receiving apparatus in a case where the communication unit is performing communication that is not associated at least with control of power transmission to the power receiving apparatus, and
causing the power transmission unit to notify the power receiving apparatus, via the control communication, that the transmission power to the power receiving apparatus is limited in the case where the communication unit performs the communication that is not associated at least with the control of the power transmission to the power receiving apparatus.

10. A non-transitory recording medium that records a program for causing a computer provided in a power transmission apparatus including a power transmission unit and a communication unit to:

causing the power transmission unit to wirelessly transmit power to a power receiving apparatus and to perform, with the power receiving apparatus, control communication associated with a control of the power transmission to the power receiving apparatus;

causing the communication unit to perform communication;

causing the power transmission unit to limit the power to be sent to the power receiving apparatus in a case where the communication unit is performing communication that is not associated at least with control of power transmission to the power receiving apparatus, and causing the power transmission unit to notify the power receiving apparatus, via the control communication, that the transmission power to the power receiving apparatus is limited in the case where the communication unit performs the communication that is not associated at least with the control of the power transmission to the power receiving apparatus.

11. The power transmission apparatus according to claim 1, wherein, in the case where the communication unit performs the communication that is not associated at least with the control of the power transmission to the power receiving apparatus, the power transmission unit further notifies, via the control communication, information representing a reason why the transmission power to the power receiving apparatus is limited.

12. The power transmission apparatus according to claim 1, wherein the communication that is not associated at least with the control of the power transmission to the power receiving apparatus is performed by using a frequency different from a frequency used for the control communication.

* * * * *